UNITED STATES PATENT OFFICE.

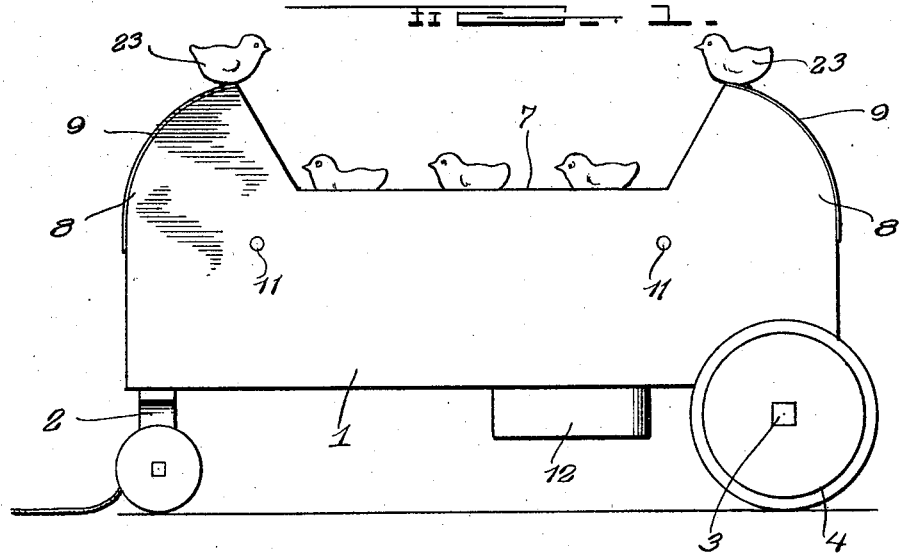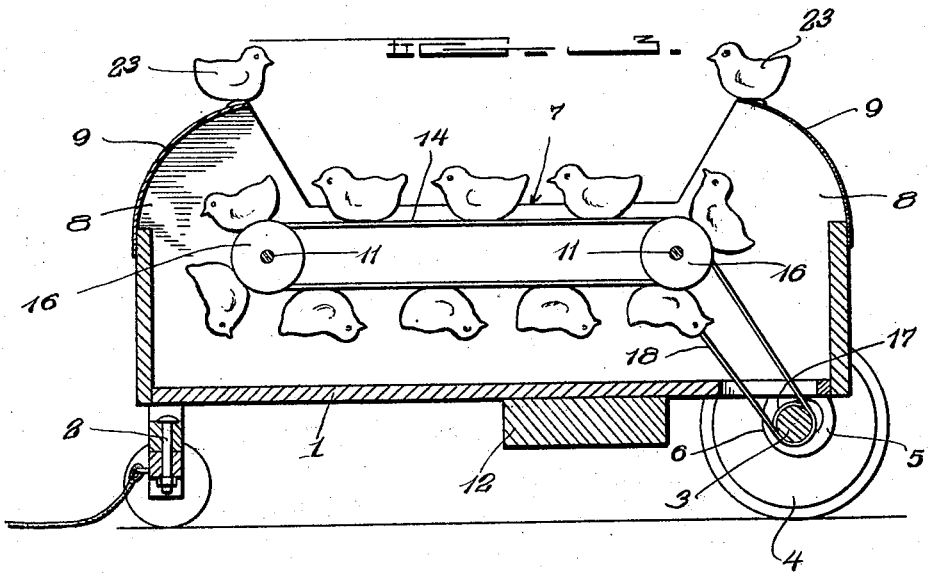

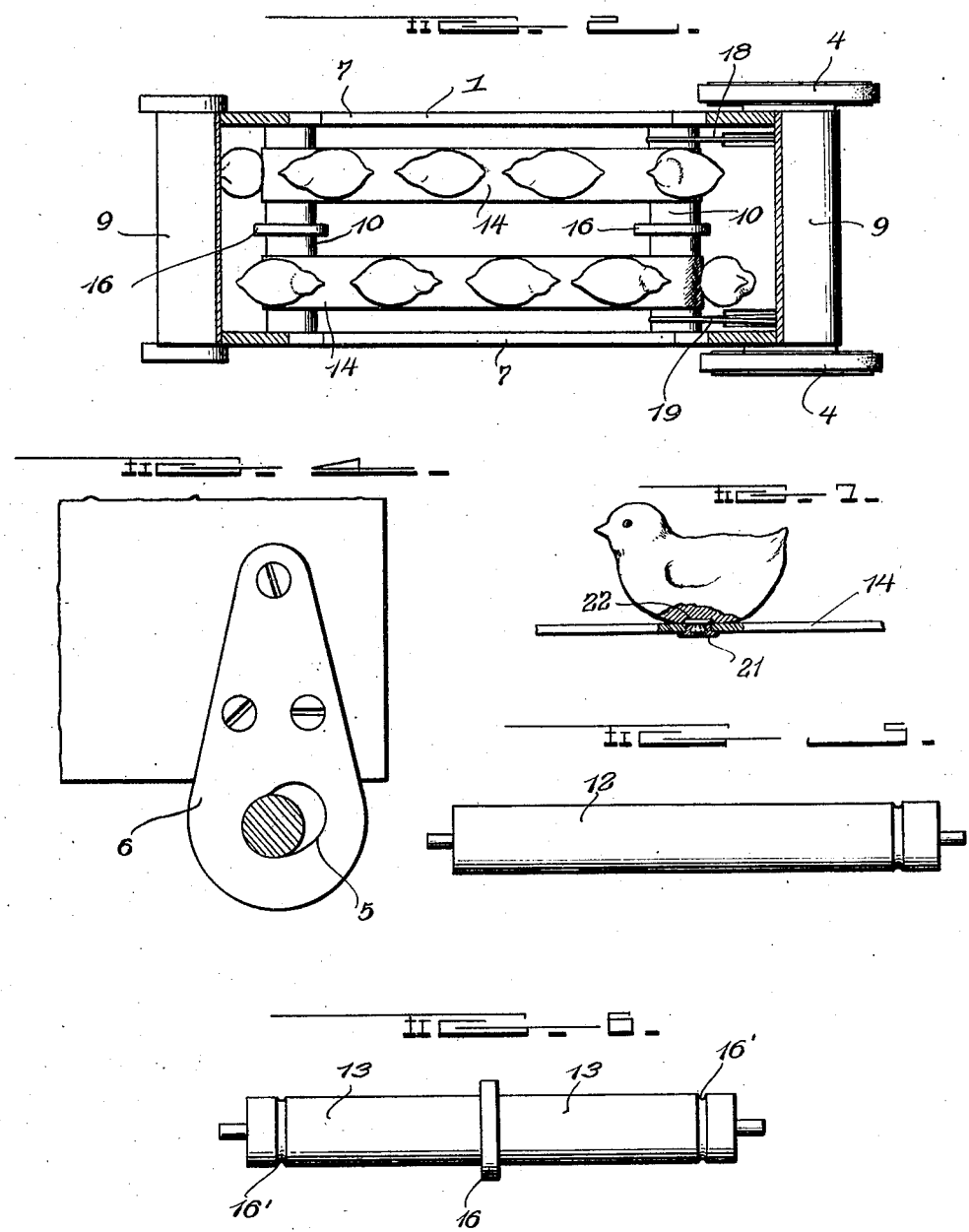

ARTHUR C. CAPONIO, OF HAVRE DE GRACE, MARYLAND.

FIGURE WHEELED TOY.

1,388,096.  Specification of Letters Patent.  Patented Aug. 16, 1921.

Application filed August 17, 1920. Serial No. 404,089.

*To all whom it may concern:*

Be it known that I, ARTHUR C. CAPONIO, a citizen of the United States, residing at Havre de Grace, in the county of Harford and State of Maryland, have invented new and useful Improvements in Figure Wheeled Toys, of which the following is a specification.

This invention relates to a wheeled toy, the principal object of the invention being to provide a toy made in the form of a wagon which may be pulled along by the child and which contains endless belts containing figures, the belts being so connected with one of the axles of the wagon that they will be caused to move when the wagon is being pulled along so that the figures on the belts will be brought successively into view at the top of the wagon.

Another object of the invention is to so connect the different belts to the axle that one belt will be driven in one direction and the other in another direction.

A further object of the invention is to so mount the rear axle that the belts connecting the supporting roller of the endless belts with the axle will be automatically kept under tension.

A still further object of the invention is to provide means whereby the figures on the endless belts may be easily and quickly replaced by other figures.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the invention.

Fig. 2 is a top view with parts broken away.

Fig. 3 is a longitudinal vertical section.

Fig. 4 is a detail view showing the means for mounting the rear axle.

Fig. 5 is a view of one of the endless belt supporting rollers which is used when only one belt is being used.

Fig. 6 is a detail view of one of the short rollers for use with a pair of endless belts.

In these views 1 indicates the wagon body which is supported by the front truck 2, which is swiveled to the body, and the rear axle 3 and its supporting wheels 4. This axle is made in the form of a roller with its ends passing through the relatively large openings 5 formed in the hangers 6 which are secured to the sides of the body. By this arrangement of parts the rear axle can move rearwardly in the hangers when being pulled along for a purpose to be hereinafter described.

The central part of the sides of the body are cut-away to provide the openings 7 and their ends are rounded as at 8 and these rounded ends have secured thereto the covering strips 9 which cover the end portions of the wagon body. Rollers 10 are pivotally supported in the body by the pins 11, the rollers being located adjacent the ends of the body. If only one belt is to be used a pair of long rollers extending from side to side of the bottom is used, such as that shown at 12, in Fig. 6, but I prefer to use two belts and in this case each pin would carry a pair of short rollers 13 which support the two endless belts 14. The rollers of each pair may be separated by the washers 16 placed on the pins. Each roller of the rear pair is provided with an annular groove 16 and the rear axle 3 is provided with a pair of annular grooves 17. A straight belt 18 connects one of the grooved rollers with the axle while a cross belt 19 connects the other grooved roller with the axle, these belts engaging the grooves. Where only one belt is used the rear roller would be provided with one groove and a belt would connect this groove with a groove in the axle.

A weight 12 is placed on the bottom of the wagon and the rear wheels may be provided with rubber tires to provide traction.

It will thus be seen that when the toy wagon is pulled along the rubber tires and the weight will cause the rear wheels and the axle to revolve and the rotation of this axle will be communicated to the rear rollers of the endless belts by the cord belts 18 and 19 so that the endless belts will be driven in opposite directions. The cord belts are kept taut by the tendency of the rear axle to move rearwardly in the openings in the hangers.

I place figures on the endless belts so that these figures will be caused to appear and disappear at the closed ends of the body and are moved along the upper reach of each belt so as to be seen through the openings 5. The figures on one belt are driven in one direction while those on the other belt are driven in the opposite direction so that the two rows of figures will pass each other. The figures shown in the drawings are small chicks but it will of course be understood that other figures may be used. In order to make the toy more attractive to the child I prefer to detachably connect the figures to the belts and I may do this by placing one part of a snap fastener 21 on the belt and the other part 22 on the figure so that the figures may be easily and quickly attached to or detached from the endless belts. By providing different kinds of figures to be sold with the wagon the child can place the figures he desires on the belts. I may also place some of the figures on the top of the wagon as shown at 23.

I may make the front rollers of tapered shape, so as to keep the endless belt which carries the figures away from the driving belt.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A toy comprising a body having an opening in its upper part, spaced rollers journaled in the body, an endless belt passing over said rollers, figures carried by the belt and arranged to appear through said opening when the belt is being moved by the rotation of the rollers, hangers at the rear or the body having oblong openings therein, a roller axle engaging said openings and adapted to move to the rear ends of said openings when the toy is moved forwardly, a belt connecting said roller axle with one of the before mentioned rollers and adapted to be tensioned by the rearward movement of the roller axle so that it will transmit the movement of said axle to the roller, wheels connected with the ends of said roller axle and front wheels for the body.

In testimony whereof I affix my signature.

ARTHUR C. CAPONIC.